United States Patent
Shimosaka et al.

[11] Patent Number: 5,947,844
[45] Date of Patent: Sep. 7, 1999

[54] GOLF BALL AND MOLD THEREFOR

[75] Inventors: Hirotaka Shimosaka; Keisuke Ihara; Yutaka Masutani; Michio Inoue; Atsuki Kasashima, all of Chichibu, Japan

[73] Assignee: Bridgestone Sports Co., Ltd., Tokyo, Japan

[21] Appl. No.: 08/935,633

[22] Filed: Sep. 23, 1997

[30] Foreign Application Priority Data

Sep. 26, 1996 [JP] Japan .................................. 8-275383

[51] Int. Cl.⁶ .................................................. A63B 37/14
[52] U.S. Cl. ........................... 473/379; 473/383; 473/381
[58] Field of Search .................................. 473/383, 384, 473/379, 381

[56] References Cited

U.S. PATENT DOCUMENTS 5,201,523  4/1993  Miller .................................... 473/383

FOREIGN PATENT DOCUMENTS

61-173907  8/1986  Japan .
6-143349   5/1994  Japan .

*Primary Examiner*—George J. Marlo
*Attorney, Agent, or Firm*—Sughrue, Mion, Zinn, Macpeak & Seas, PLLC

[57] ABSTRACT

A golf ball having a plurality of dimples on its spherical surface molded by a mold which has a spherical cavity therein and is composed of a pair of mold sections being removably mated along with a parting surface at the position corresponding to an equator line of the spherical cavity of the mold, wherein at least one dimple lies across the equator line of the ball, such that a center of the dimple is displaced from the equator line, and the dimple is formed by a pin disposed at the parting surface of the mold sections such that a center axis passing the axial center of the pin is positioned below or above the parting line.

10 Claims, 12 Drawing Sheets

GOLF BALL AND MOLD THEREFOR

BACKGROUND OF THE INVENTION

1. Field of the Invention

This invention relates to a golf ball, more particularly, to a golf ball featuring a drastically improved degree of freedom of dimple design, improved flight performance, and symmetry. It also relates to a mold for use in the molding of such golf balls.

2. Prior Art

Golf balls are generally manufactured by using a mold including a pair of mold sections which are removably mated to define a spherical cavity therein and by feeding a stock material into the cavity. The parting line between the mold sections is a straight line rather than curvilinear for the purpose of simplifying mold manufacture. The linear parting line is coincident with the equator line on the golf ball surface. When a golf ball is molded in the mold, no dimples are formed on the equator line corresponding to the parting line and a great circle having a certain width is defined on the spherical surface.

For the golf ball having on the equator line a relatively wide great circle band which does not intersect with dimples, however, it is difficult to uniformly distribute dimples on the golf ball spherical surface. The ball is thus more or less non-uniform in aerodynamic symmetry. The flight performance varies with a particular position at which the ball is hit.

Figure 14:
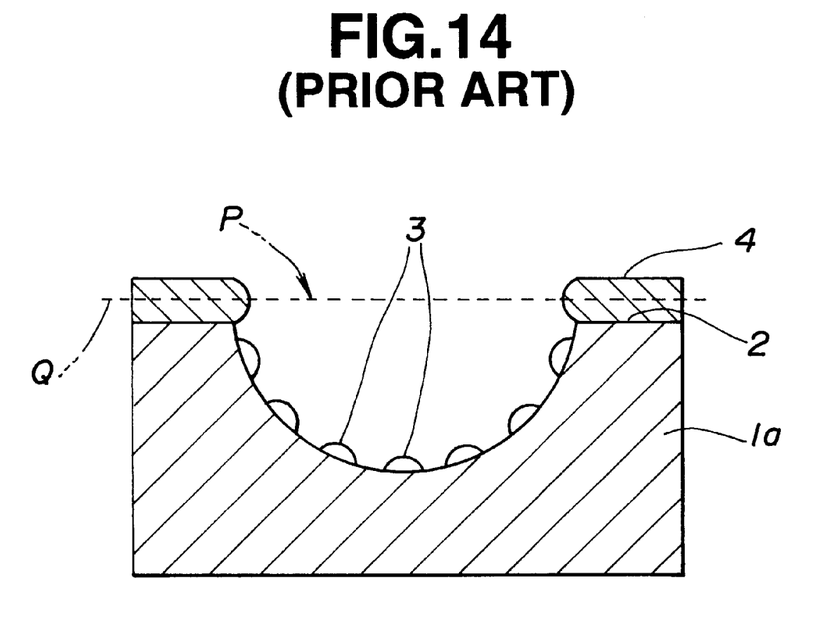
FIG. 14 is a schematic cross-sectional view of a prior art lower mold section.

In order to overcome the above-mentioned problems, golf balls which eliminated a wide great circle band on the equator line and have dimples on the equator line were proposed in JP-A 173907/1986 and 143349/1994. These proposals are briefly described with reference to FIGS. 14 to 18. A mold is equally divided into two mold sections (only a lower mold section 1a is shown in FIG. 14), semi-circular grooves 2 are radially formed in the parting line or surface P of each mold section, and cylindrical members or pins 4 whose inner end defines a dimple-forming round protrusion 3 are fixedly received in the grooves 2. Using this mold, a golf ball having dimples lying across the equator line can be produced.

Figure 15:
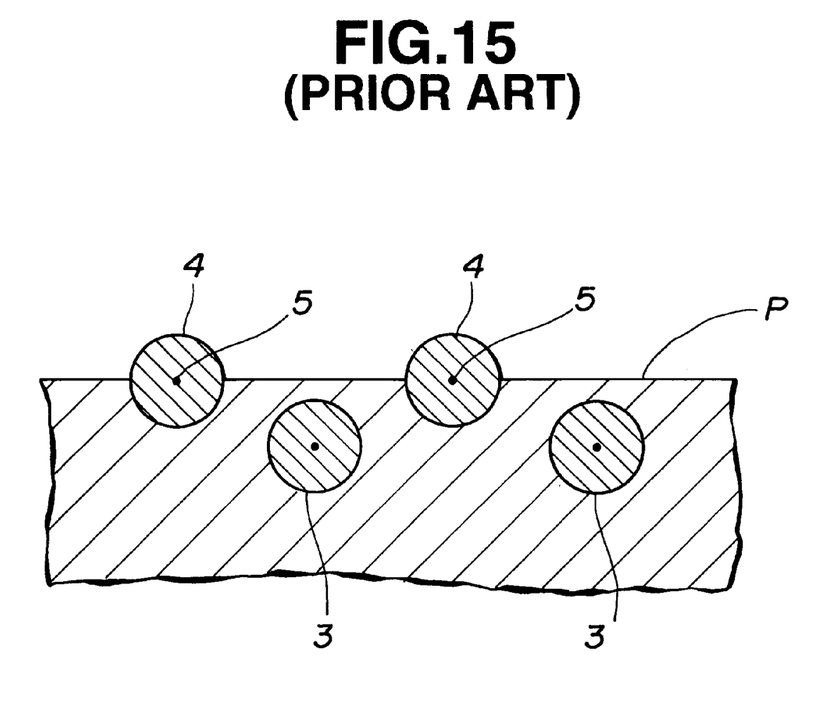
FIG. 15 is a partial elevational cross-sectional view of a parting surface adjacent portion of the prior art lower mold section.
Figure 16:
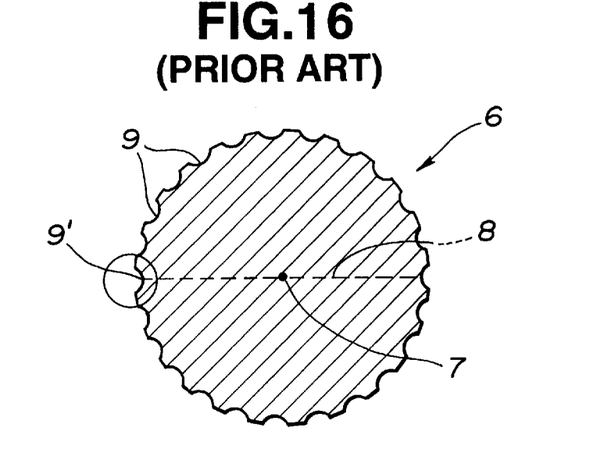
FIG. 16 is a schematic cross-sectional view of a prior art golf ball.
Figure 17:
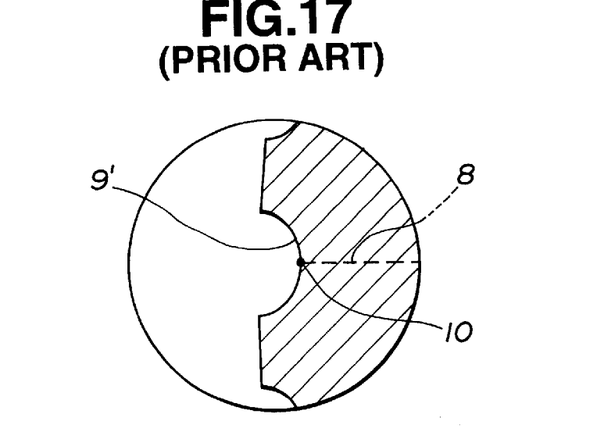
FIG. 17 is an enlarged cross-sectional view of a dimple lying across the equator line.
Figure 18:
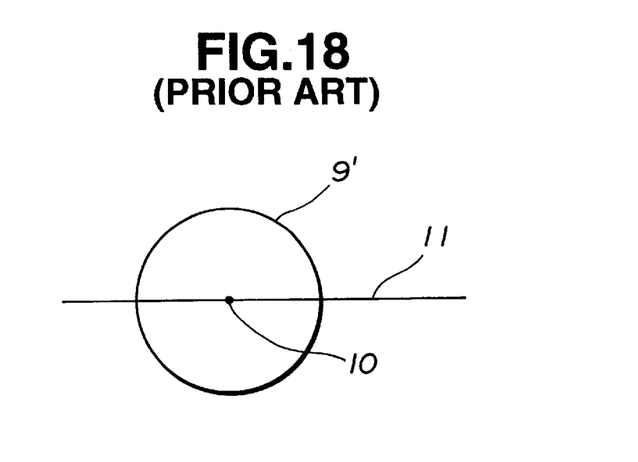
FIG. 18 illustrates the dimple lying across the equator line, showing the alignment of the dimple with the equator line.

In this mold, however, the pins 4 are disposed such that their center 5 is aligned with the parting line P as shown in FIG. 15. As a result, the equator plane 8 passing the center 7 of the golf ball 6 obtained using this mold also passes the center of the dimple 9' lying astride the equator line as shown in FIGS. 16 to 18. Differently stated, the dimple 9' lying across the equator line 11 has the center coincident with the equator line 11 of the ball as best shown in FIG. 18.

Since the golf ball has dimples arranged such that some dimples are aligned with the equator line, the degree of freedom of dimple design is low due to such restriction while the spacing between the remaining dimples varies. This prohibits a diverse, high density, uniform dimple arrangement.

The golf ball molded using the above-mentioned mold wherein some dimples are aligned with the equator line has the likelihood that burrs form at the center of these dimples. Such burrs cannot be removed by conventional polishing techniques, but by the worker's manual operation, which results in low productivity. Further the finishing step includes surface polishing of the ball whereby an area adjacent the equator line is scraped off. Since the dimple edge is then lost, dimples with a sufficient depth are not available.

SUMMARY OF THE INVENTION

Therefore, an object of the present invention is to provide a golf ball having an outstandingly increased degree of freedom of dimple design, enabling a diverse, high density, uniform dimple arrangement, and featuring improved flight performance and symmetry. Another object of the present invention is to provide an improved mold for use in the manufacture of such golf balls.

According to a first aspect of the invention, there is provided a golf ball having a plurality of dimples in its spherical surface having an equator. At least one dimple lies across the equator of the ball, but is not aligned with the equator. Preferably, the dimple lying across the equator is axisymmetric with respect to an axis of symmetry passing the center of the dimple, and the axis of symmetry is located outside and parallel to the equator plane of the ball.

According to a second aspect of the invention, there is provided a golf ball mold comprising a pair of mold sections which are removably mated along a parting surface to define a spherical cavity between their inner surfaces. The cavity surfaces are provided with a plurality of dimple-forming protrusions. Dimple-forming pins having an axis and an inner end of dimple-forming shape are disposed at the parting surface such that the axis of the pin is located outside and parallel to the parting surface. Preferably, one mold section is provided with deep grooves in which dimple-forming pins are received and secured and the other mold section is provided with shallow grooves such that when the mold sections are mated together, the deep and shallow grooves are also mated to define bores in which the dimple-forming pins are extended.

In preferred embodiments, the dimples are distributed in a regular icosahedral, regular octahedral or regular tetrahedral arrangement pattern. Also, the dimple arrangement pattern is 2-, 3-, 4- or 5-fold axial about the pole of a hemisphere of the golf ball (see FIG. 11).

The above-mentioned construction of the invention allows for diverse and free dimple design which can never be accomplished with a prior art golf ball wherein a wide great circle band intersecting with no dimples extends along the equator line or a prior art golf ball wherein those dimples lying across the equator line are aligned with the equator line.

In conjunction with a golf ball having a plurality of dimples in its spherical surface having an equator, the inventors have found that when dimples are arranged such that at least one dimple lies across the equator line of the ball, but the center of that dimple lying across the equator line is not coincident with the equator (that is, the center of that dimple is located above or below the equator line), a diverse, dense and uniform dimple arrangement becomes possible without difficulty and without a need to take into account the equator line of the ball surface. The degree of freedom of dimple design is drastically increased. Quite unexpectedly, the golf ball employing the above-mentioned dimple arrangement is also improved in symmetry and flight performance.

The golf ball having the dimple arrangement according to the invention has the advantage of increased productivity. Since no dimples are aligned with the equator line, burrs which are difficult to remove if formed as in the prior art do not form in proximity to the dimple center. Cumbersome, labor-consuming deburring operation is unnecessary. The burden of post-treatment is mitigated.

Those dimples lying across the equator line are substantially deep in shape and present a definite edge. Even if an area adjacent the equator line is somewhat scraped off by deburring and polishing, the dimple depth is kept substantially unchanged. A sufficient dimple depth is ensured.

The golf ball having an optimum dimple arrangement according to the invention is manufactured using a golf ball mold comprising a pair of mold sections which are removably mated along a parting surface to define a spherical cavity between their inner surfaces, the cavity surfaces being provided with a plurality of dimple-forming protrusions. Dimple-forming pins are disposed at the parting surface such that the axis of the pin is located outside (above or below) the parting surface and extends parallel to the parting surface. An optimum dimple arrangement is freely predetermined without a need to take into account the parting line. The positions at which dimple-forming pins are disposed are properly adjusted in accordance with the optimum dimple arrangement. As a result, a golf ball of quality having a diverse and optimum dimple arrangement and improved symmetry and flight performance can be manufactured.

BRIEF DESCRIPTION OF THE DRAWINGS

FIG. 7 illustrates how to secure a dimple-forming pin in the mold section, FIG. 7(A) showing a groove and FIG. 7(B) showing the pin secured in the groove.

FIG. 8 illustrates how to secure a dimple-forming pin in the mold section, FIG. 8(A) showing a U-shaped groove, FIG. 8(B) showing the pin received in the groove, and FIG. 8(C) showing the pin secured in the groove.

FIG. 13 illustrates the direction in which a golf ball is hit by a club, FIG. 13(A) corresponding to pole hitting and FIG. 13(B) corresponding to seam hitting.

DESCRIPTION OF THE PREFERRED EMBODIMENTS

Referring to FIGS. 1 through 8, one embodiment of the present invention is described. In FIGS. 1–8 and FIGS. 14–18, like parts are designated by the same numerals.

Figure 1:
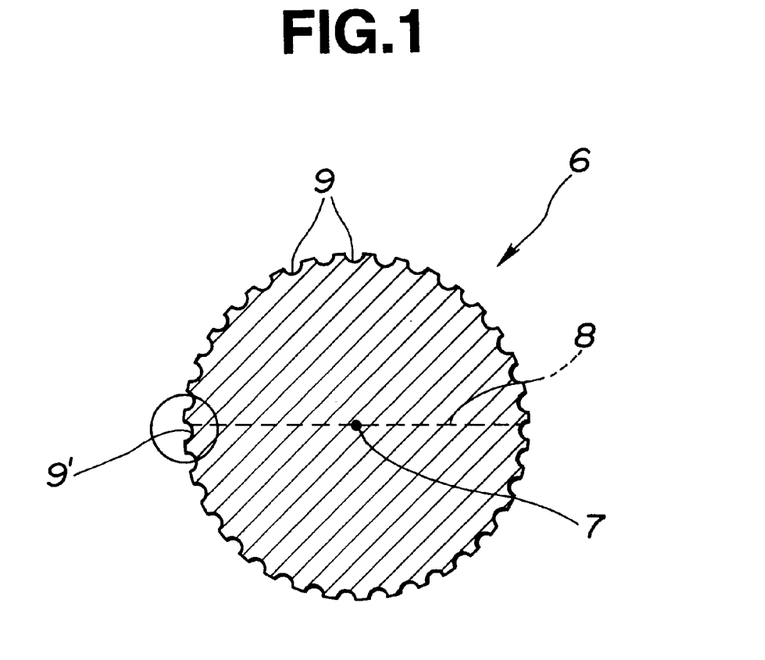
FIG. 1 is a schematic cross-sectional view of a golf ball according to one embodiment of the invention.
Figure 2:
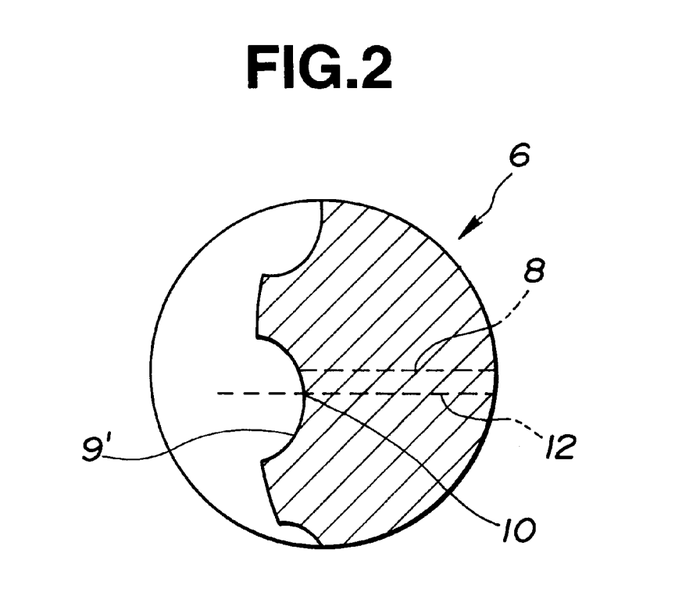
FIG. 2 is an enlarged cross-sectional view of one dimple lying across the equator line (the circular portion of FIG. 1).
Figure 3:
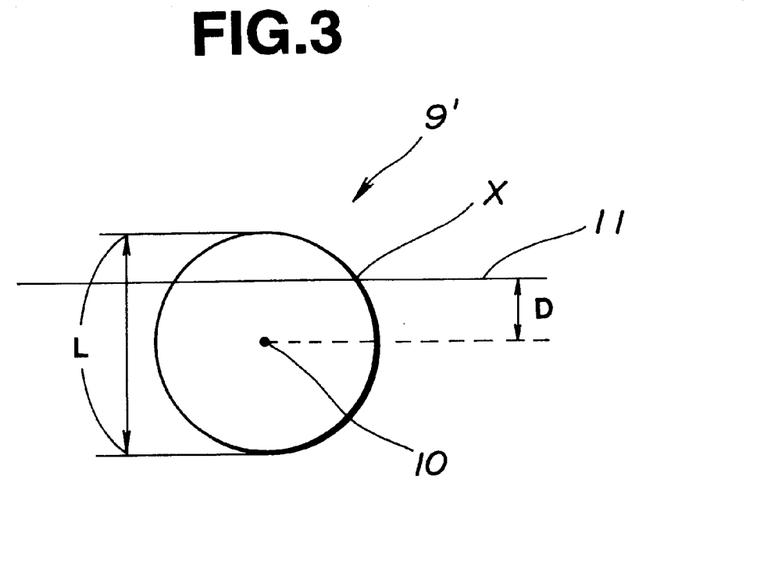
FIG. 3 illustrates the dimple lying across the equator line, showing the relationship between the dimple center and the equator line.

FIG. 1 schematically shows in cross section a golf ball 6 according to one embodiment of the invention. The golf ball 6 has a plurality of dimples 9 indented in its spherical surface. The ball 6 has an equator represented by an equator plane 8 and an equator line 11. A typical dimple 9 is a circle having a center and a diameter L in planar shape as shown in FIG. 3. The dimple 9 is axisymmetric with respect to an axis of symmetry 12 passing the center as shown in FIGS. 2 and 3. Among the dimples 9, those dimples 9' lying across the equator line or parting line 11 of the ball 6 have the center positioned below the equator line 11. Differently stated, the center of the equator-bestriding dimples 9' is off the equator line 11. That is, the equator-bestriding dimples 9' are not aligned with the equator line 11. As seen from FIG. 2, the axis of symmetry 12 of the equator overlapping dimple 9' is positioned below the equator plane 8 of the ball and extended parallel to the equator plane 8. Understandably, the center of the dimple 9' may be positioned above the equator line 11 though such an embodiment is not shown.

The circular edge of the dimple 9' lying across the equator line 11 intersects with the equator line 11 at points X as shown in FIG. 3. The point of intersection X between the dimple edge and the equator line 11 is not fixed, but may be identical or different among the dimples lying across the equator line so that a dimple arrangement may be freely designed. Usually, the distance D between the center of the dimple 9' and the equator line 11 is 1 to 45%, especially 1 to 30% of the dimple diameter L.

The number of dimples 9' lying across the equator line 11 is not fixed and varies with the dimple arrangement, overall dimple number and ball shape. The number of equator-bestriding dimples 9' is at least 1 and at most 80, preferably 8 to 60.

In the golf ball of the invention, the overall number of dimples is generally 240 to 600, preferably 340 to 450. The dimple diameter is generally 2.0 to 4.6 mm, preferably 3.2 to 4.0 mm. The dimple depth is generally 0.1 to 0.25 mm, preferably 0.13 to 0.2 mm. The type of dimples is not limited to one, and dimples of two or more types may be distributed. The planar shape of dimples is not critical and various shapes are acceptable although symmetrical circular dimples are typically used.

Figure 9:
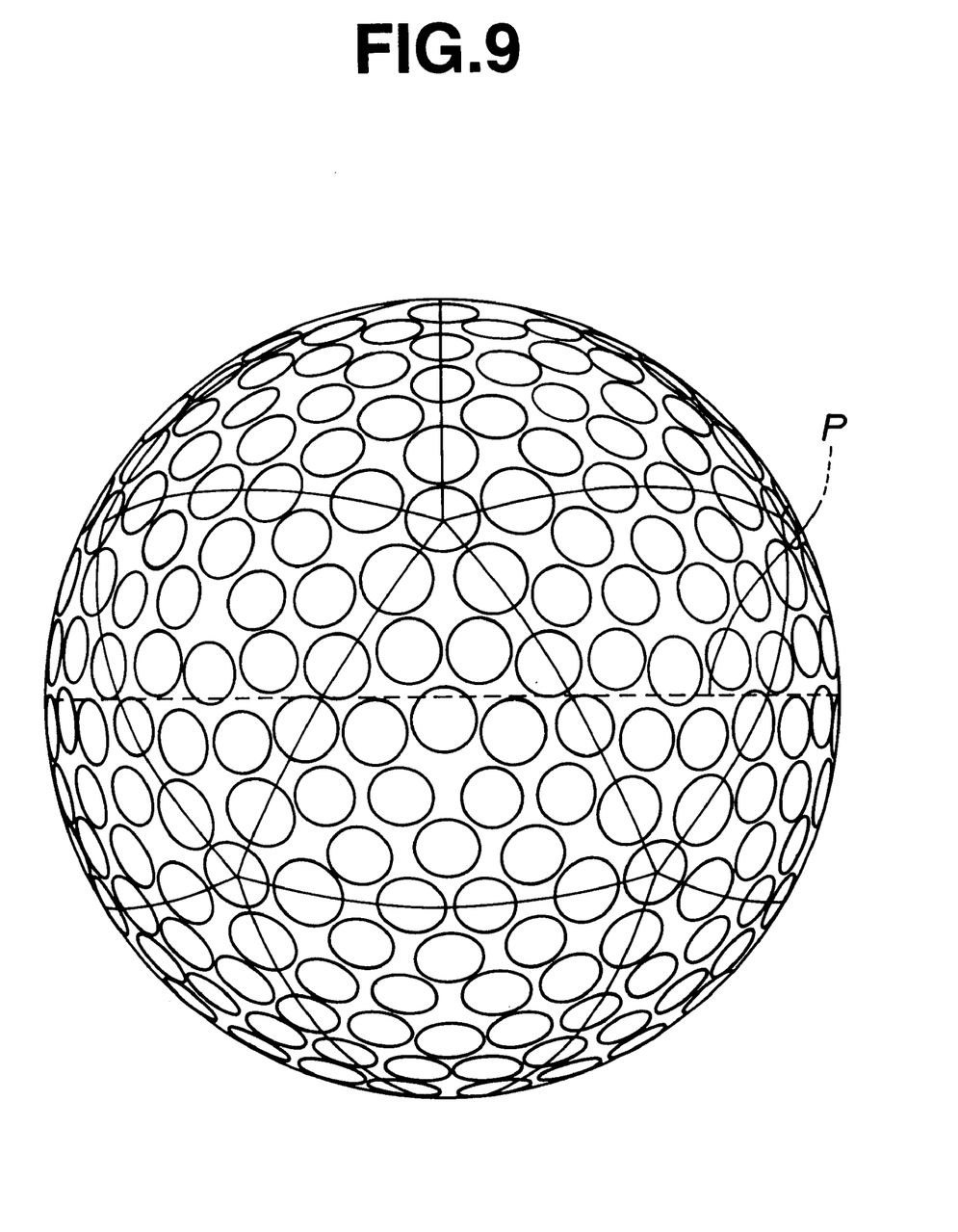
FIG. 9 illustrates a regular icosahedral dimple arrangement pattern.
Figure 10:
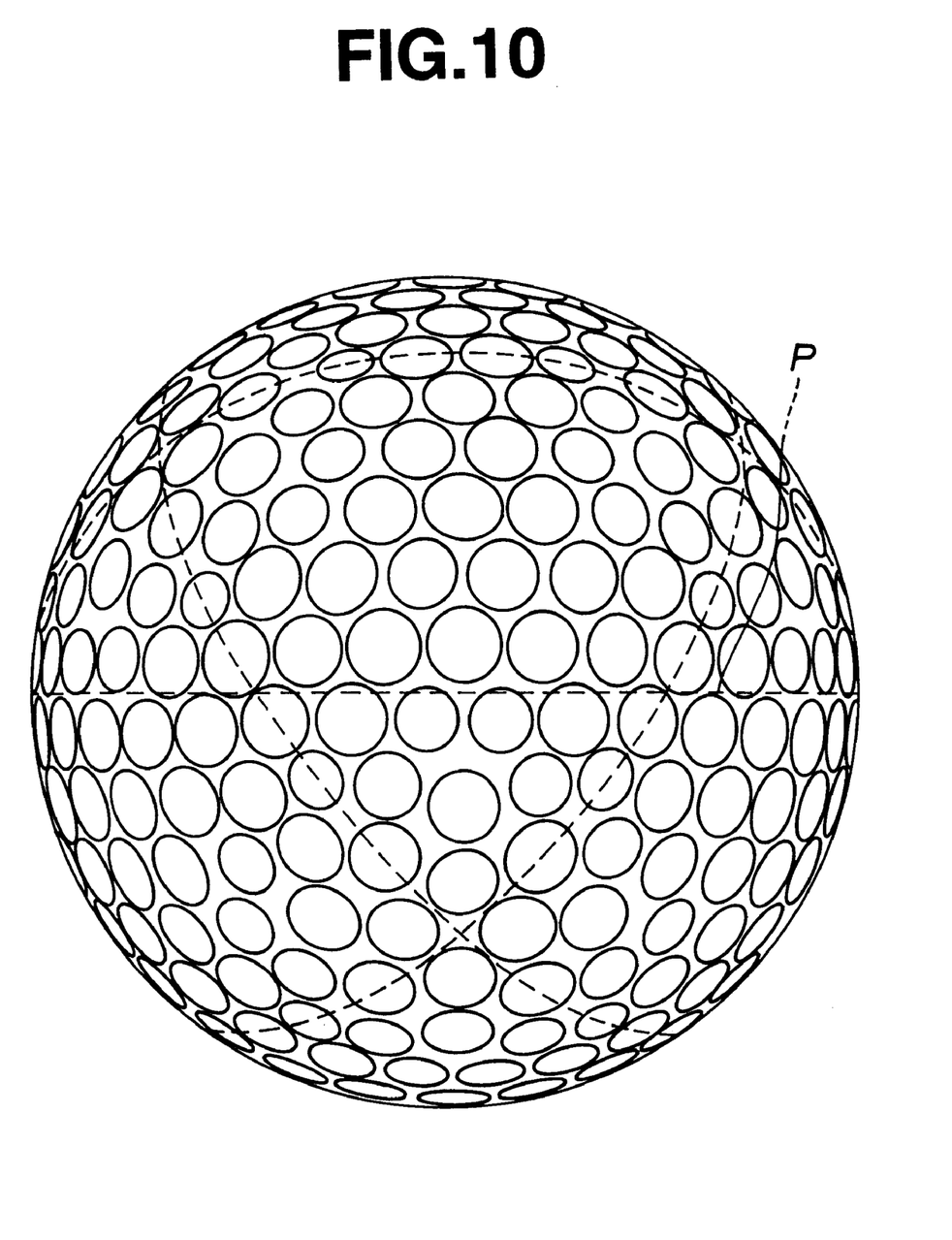
FIG. 10 illustrates a regular octahedral dimple arrangement pattern.
Figure 11:
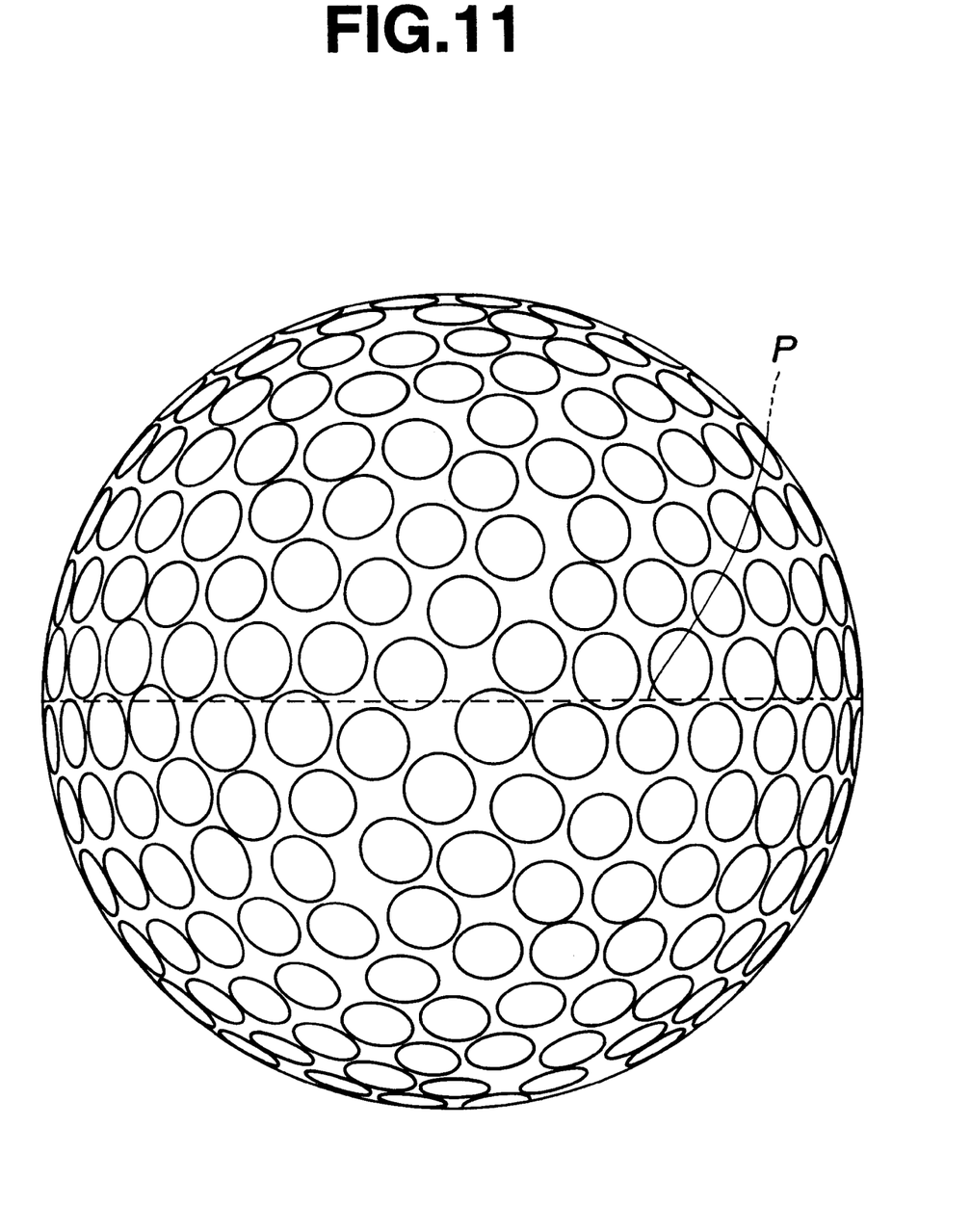
FIG. 11 illustrates a 2-fold axial dimple arrangement pattern.

The dimple arrangement pattern on the golf ball of the invention is not critical insofar as at least one dimple lies across the equator line. Dimples may be distributed in a regular icosahedral arrangement pattern, regular octahedral arrangement pattern or regular tetrahedral arrangement pattern. Dimples are also distributed such that the dimple arrangement pattern may be 2-fold axial, 3-fold axial, 4-fold axial or 5-fold axial about the pole of a hemisphere of the golf ball (see FIG. 11). Since any of the above-mentioned dimple arrangement patterns imposes fewer restrictions on the dimple arrangement, a diverse, dense, uniform dimple design is possible. FIGS. 9, 10, and 11 show the regular icosahedral dimple arrangement, regular octahedral dimple arrangement, and 2-fold axial dimple arrangement, respectively.

FIGS. 4 to 8 shows one exemplary mold for molding the golf ball of the invention. The mold includes a pair of upper and lower mold sections. The upper and lower mold sections are removably mated along a parting surface P. Since the mold sections are substantially identical, only the lower mold section is shown.

Figure 4:
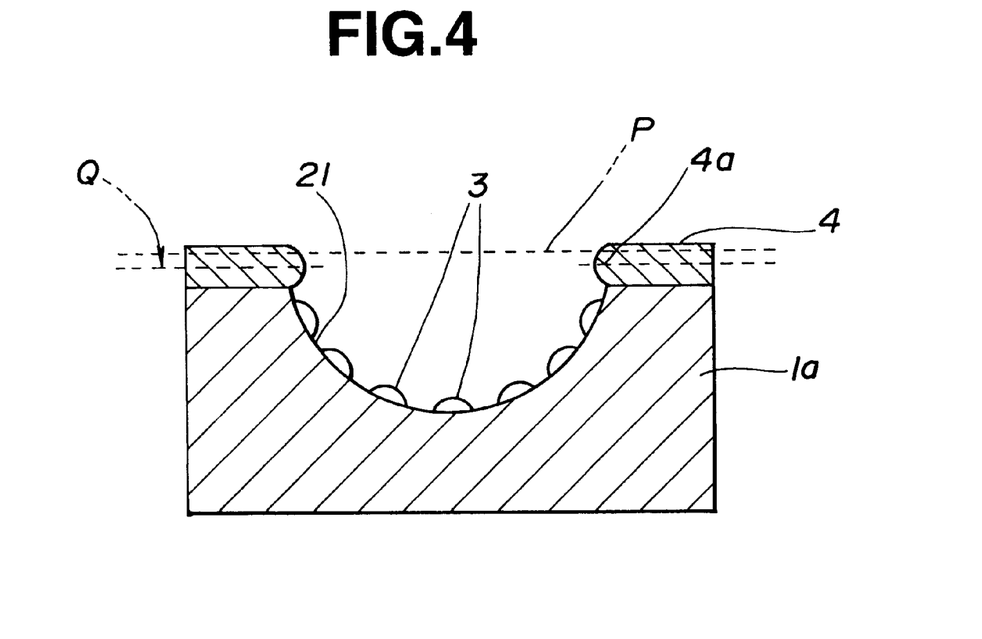
FIG. 4 is a schematic cross-sectional view of a lower mold section according to another embodiment of the invention.

The lower mold section 1a has a hemispherical cavity surface 21 which is provided with a plurality of dimple-forming protrusions 3. Dimple-forming pins 4 are disposed at the parting surface P and extended in a radial direction with respect to the center of the spherical cavity. Each dimple-forming pin 4 has a radially inner end 4a whose shape is identical with or different from the dimple forming protrusions 3. It is noted that where two or more types of dimple-forming protrusions 3 are present, the inner end shape of the dimple-forming pins 4 may be properly selected from the two or more types of dimple-forming protrusions 3 and may be identical or different.

Each dimple-forming pin 4 having a central axis or axis of symmetry Q passing the center thereof is disposed such that the axis of symmetry Q is positioned below the parting line P as shown in FIG. 4. It is noted that the axis of symmetry Q of the pin 4 may be positioned above the parting line P though such an embodiment is not shown. By adjusting the position of the pins 4, a dimple design with a high degree of freedom can be made without a need to take into account the parting line P. A uniform, dense, optimum dimple arrangement is accomplished.

Figure 5:
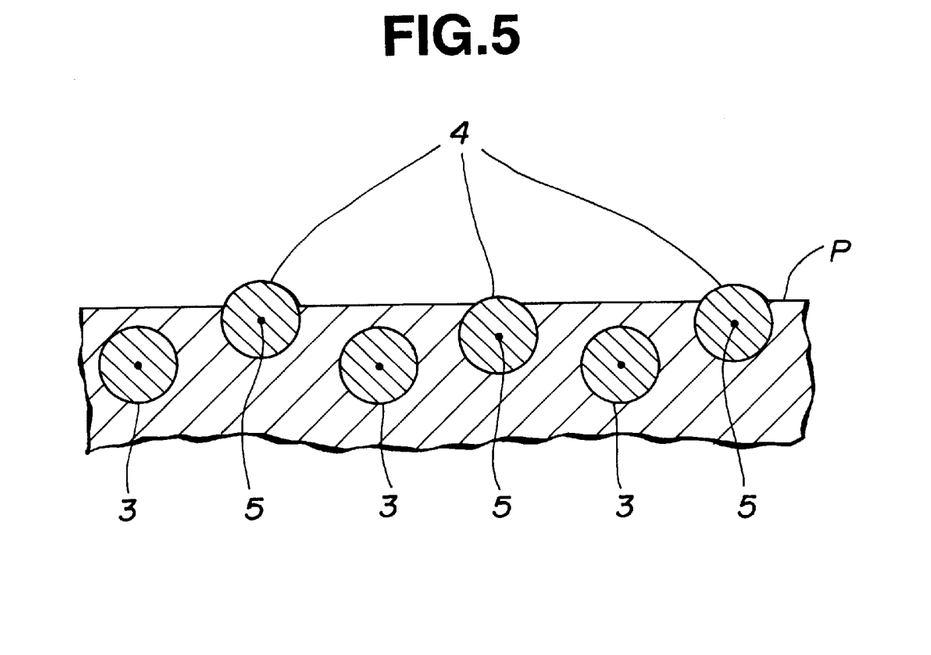
FIG. 5 is a partial elevational cross-sectional view of a parting surface adjacent portion of the lower mold section.

As seen from FIG. 5, the dimple-forming pins 4 are disposed such that the axis Q extends parallel to the parting surface P. Of course, the centers 5 of the pins 4 (corresponding to the distance of projection of the pin beyond the mold parting surface P) need not be positioned at an identical level between the pins 4. The centers 5 of the pins 4 may be properly adjusted in accordance with a selected dimple arrangement pattern. The shape of the pins 4 is not critical although a cylindrical shape is preferred because of ease of molding and ease of attachment to the mold. Also shown in FIG. 5 are dimple-forming protrusions 3.

Figure 6:
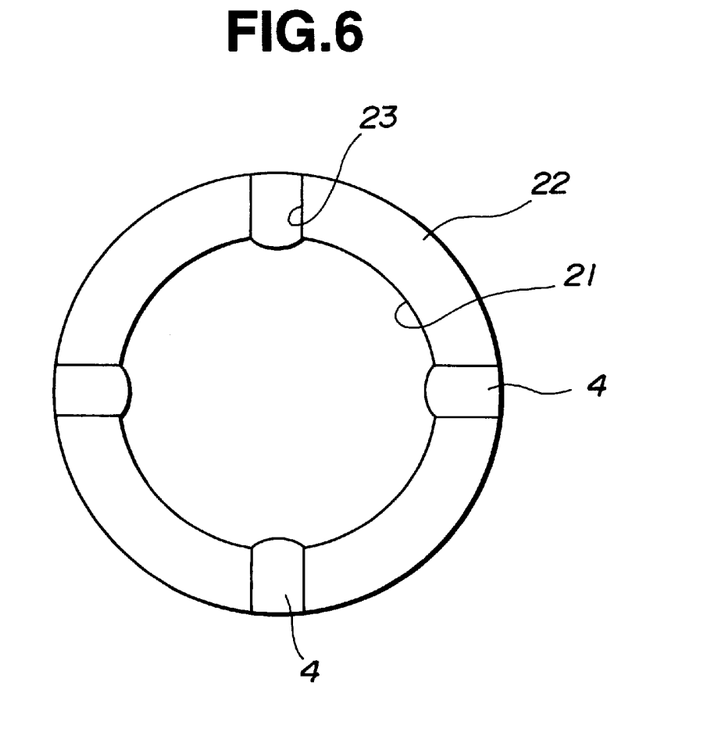
FIG. 6 is a plain view of the parting surface of the lower mold section.

The dimple-forming pins 4 are preferably disposed at diametrically opposed positions along the cavity circumscribing surface 22 of the mold parting surface P as shown in FIG. 6. The number of dimple-forming pins 4 is determined in accordance with the desired number of dimples lying across the equator line of the golf ball.

The dimple-forming pins 4 radially extend in the cavity circumscribing surface 22 of the mold parting surface P. Of the upper and lower mold sections, one mold section is provided with deep grooves and the other mold section is provided with shallow grooves. The dimple-forming pins are received and secured in the deep grooves. When the mold sections are mated together, the deep and shallow grooves are also mated to define bores through which the dimple-forming pins are extended.

Figure 7A:
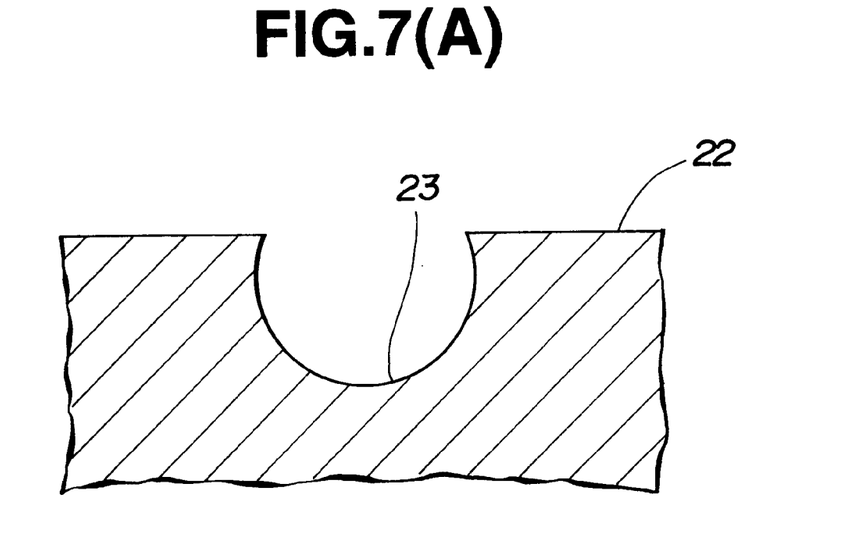
Figure 7B:
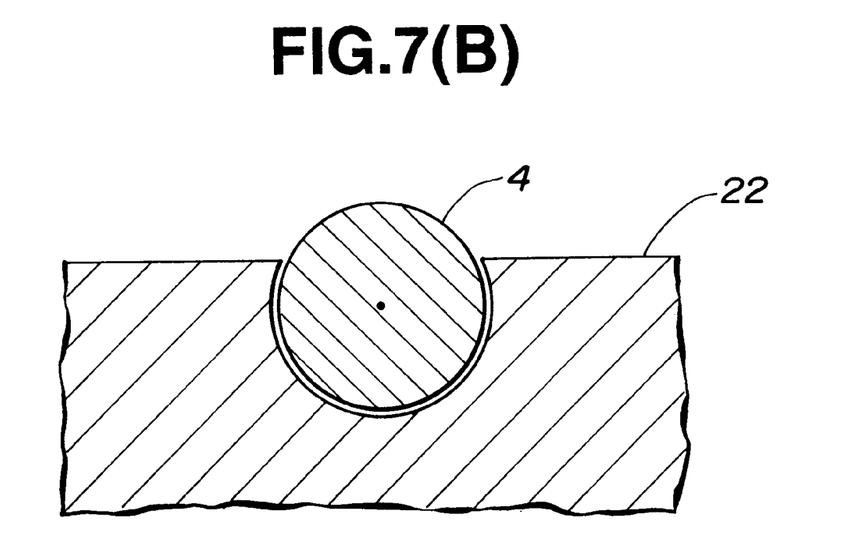
Figure 8A:
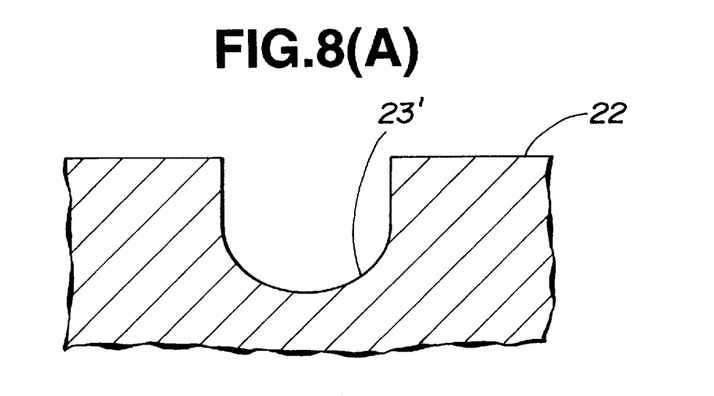
Figure 8B:
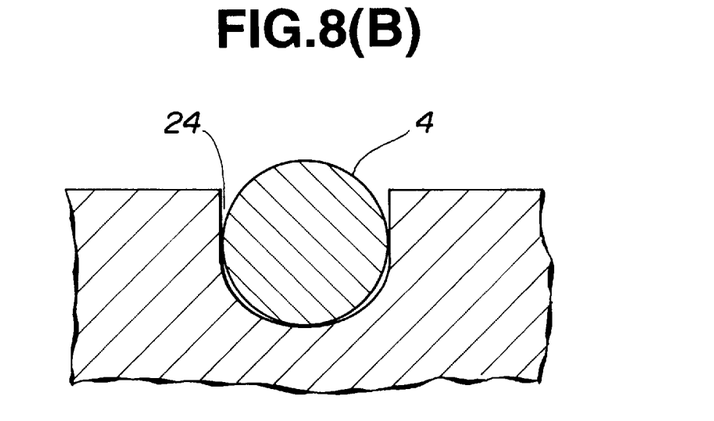
Figure 8C:
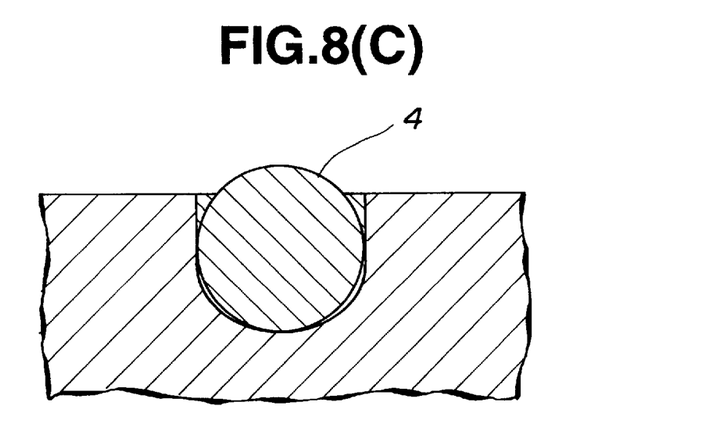

A suitable arrangement may be employed for securing the pin 4 in the deep groove. One exemplary securing arrangement is shown in FIG. 7. As shown in FIG. 7(A), the cavity circumscribing surface 22 of the lower mold section is provided with a deep circular groove 23 of such a size that about ⅔ of the pin 4 is received. The pin 4 is inserted into the groove 23 as shown in FIG. 7(B) and if desired, an adhesive or silver solder is introduced into the gap between the pin and the groove for securing the pin 4 to the groove 23. Alternatively, as shown in FIG. 8(A), the cavity circumscribing surface 22 of the lower mold section is provided with a deep U-shaped groove 23' of such a size that the majority of the pin 4 is received. The pin 4 is fitted in the groove 23' as shown in FIG. 8(B). A silver solder or the like is introduced into the gap 24 between the pin and the groove for securing the pin to the groove as shown in FIG. 8(C). Though not shown, the upper mold section may be provided with a pin securing groove. One mold section where the dimple-forming pins lying across the parting surface account for a greater area may be provided with deep grooves or U-shaped grooves.

By adjusting the depth of the pin securing grooves, the offset of the equator-bestriding dimples from the equator line, that is, the arrangement of the equator-bestriding dimples can be properly adjusted. A diverse dimple design can be freely made without a need to take into account the parting line.

Insofar as the dimple arrangement is adjusted using the above-mentioned mold and the requirements of flight performance and symmetry are met, the golf ball of the invention may have any desired structure. The invention is applicable to the manufacture of solid golf balls including one-piece golf balls, two-piece golf balls, and multi-piece golf balls of three or more layer structure as well as wound golf balls using molds. The molding method may be either injection molding or compression molding. Using the mold according to the invention, golf balls can be prepared from well-known stock materials by conventional methods.

The diameter and weight of the golf ball may be properly determined in accordance with the Rules of Golf.

The golf ball of the invention allows the arrangement of the equator-bestriding dimples to be freely adjusted. By adjusting the arrangement of the equator-bestriding dimples, a degree of freedom of dimple design is drastically improved, achieving a diverse, uniform, dense dimple arrangement. Such an optimum dimple arrangement leads to outstanding improvements in flight performance and symmetry. The ball is minimized in performance variation at different impact points and thus fully accommodates the diversified personal demand of individual golfers.

The invention is not limited to the above-illustrated embodiment. For example, the number, arrangement and inner end shape of dimple-forming pins disposed in the mold may be altered as desired. Many modifications and variations may be made within the scope of the invention.

Experiment

Figure 12:
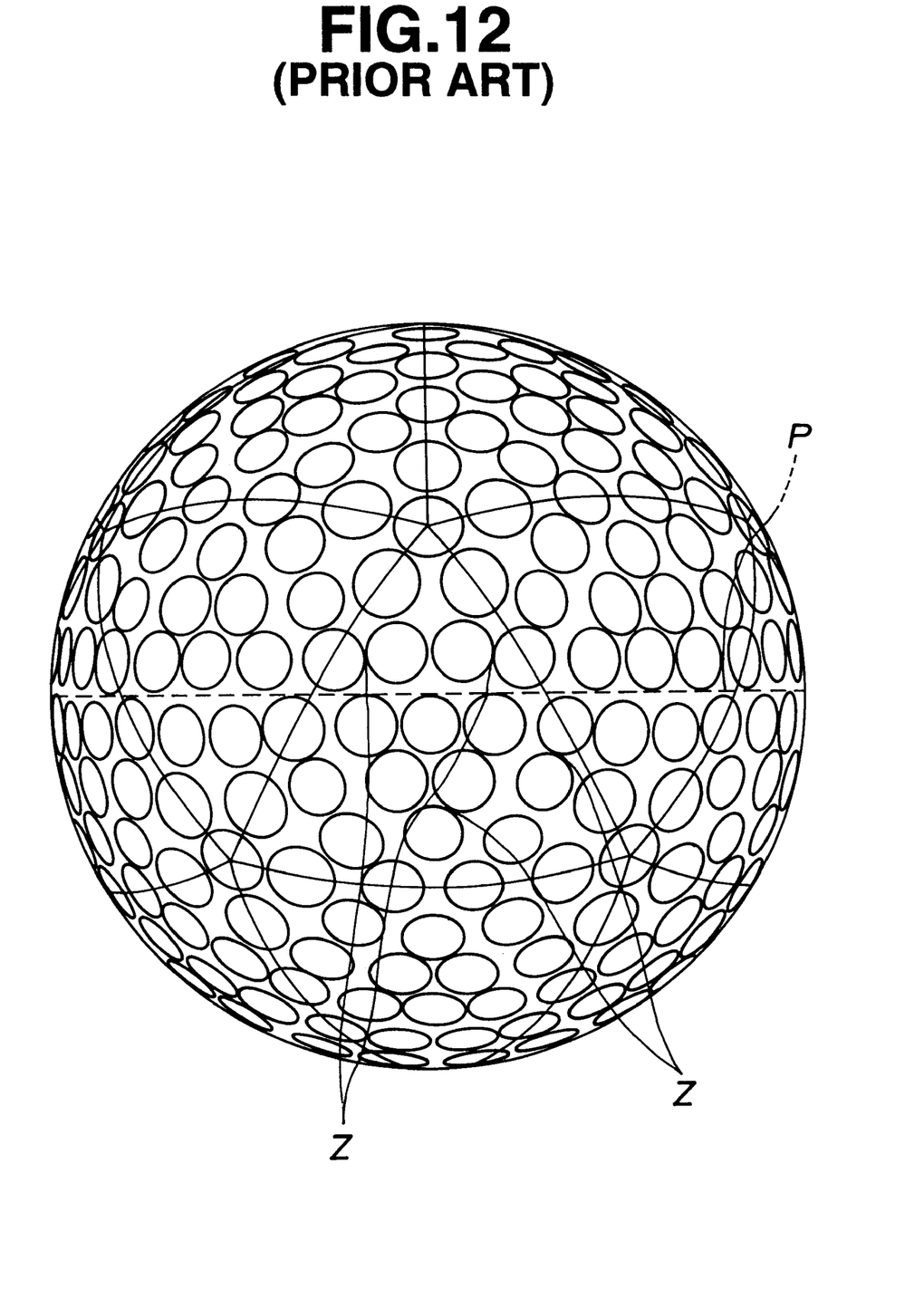
FIG. 12 illustrates a dimple arrangement pattern of Comparative Example.

Golf balls having dimples of two types A and B as shown in Table 1 formed in the surface in a total number of 372 were manufactured by molding a core from a well-known stock material by a conventional method, placing the core in a mold, and injection molding a cover stock on the core. The golf balls had a regular icosahedral arrangement of dimples which is shown in the plane views of FIG. 9 (Example) and FIG. 12 (Comparative Example). The dimple arrangement pattern of Comparative Example is a so called Wilson pattern wherein no dimples lie across the equator line, some dimples are separated by a narrow spacing as shown at Z in FIG. 12, and the dimple arrangement lacks uniformity. In contrast, Example having the same dimple arrangement pattern and dimple number as Comparative Example allows for a free design of dimple arrangement without a need to leave the parting line. That is, 30 dimples lie across the equator line. This increases the degree of freedom of dimple design and allows a uniform spacing between dimples.

TABLE 1

|  | Diameter (mm) | Depth (mm) | Number |
|---|---|---|---|
| Dimple A | 3.5 | 0.18 | 300 |
| Dimple B | 4.0 | 0.20 | 72 |

The golf balls were tested by means of a swing robot (manufactured by Miyamae K.K.) using a driver J's World Stage (manufactured by Bridgestone Sports Co., Ltd., loft 9.5°) as a club. The balls were repeatedly hit at a head speed of 45 m/sec. by pole hitting and seam hitting. The carry and total distance (expressed in meter) were measured. The results are shown in Table 2.

Figure 13A:
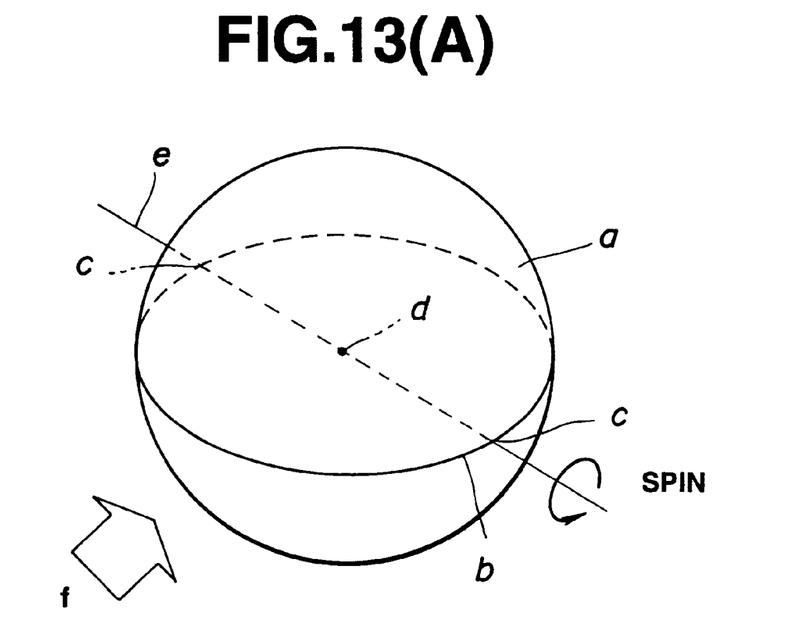
Figure 13B:
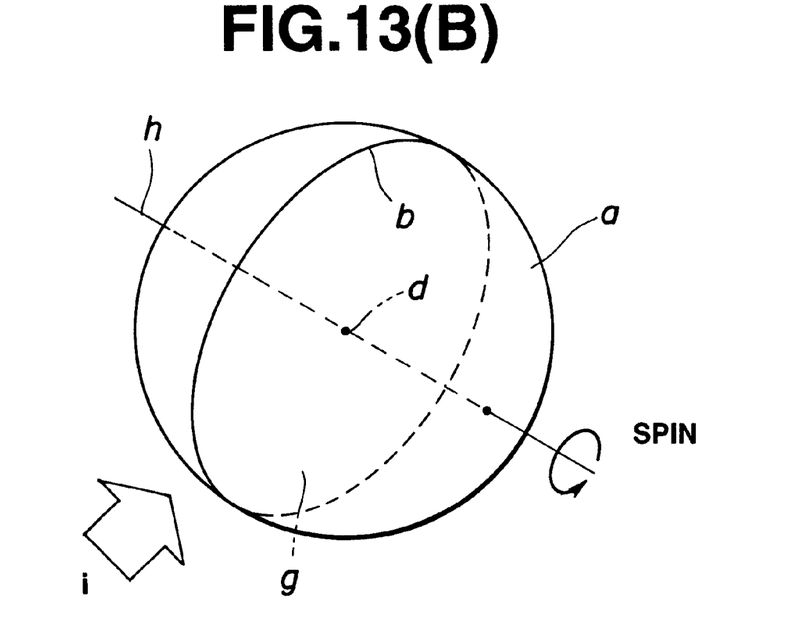

The pole and seam hitting test is used to examine the golf ball for symmetry. Reference is made to FIG. 13(A) and 13(B) wherein a golf ball (a) has a seam line (b) and a center (d). Pole hitting means that the ball (a) is hit in the direction of an arrow (f) to give back spin about a straight line (e) connecting two diametrically opposed points (c, c) on the seam line (b) and the center (d) as shown in FIG. 13(A). Seam hitting means that the ball (a) is hit in the direction of an arrow (i) so as to give back spin about a straight line (h) extending perpendicular to a circular plane (g) circumscribed by the seam line (b) and passing the center (d).

TABLE 2

|  | Carry (m) | | Total distance (m) | |
|---|---|---|---|---|
|  | Pole hitting | Seam hitting | Pole hitting | Seam hitting |
| Example | 216 | 215 | 226 | 226 |
| Comparison | 214 | 211 | 223 | 226 |

As is evident from Table 2, the golf ball of the invention allows for a drastically improved degree of freedom of dimple design, achieves a uniform dimple arrangement, and exhibits improved flight performance and symmetry.

There has been described a golf ball which offers a drastically improved degree of freedom of dimple design, allows for a diverse, uniform, dense dimple arrangement, and has high quality with respect to flight performance and symmetry.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball having a plurality of dimples on its spherical surface molded by a mold which has a spherical cavity therein and is composed of a pair of mold sections being removably mated along with a parting surface at the position corresponding to an equator line of the spherical cavity of the mold, wherein at least one dimple lies across the equator line of the ball, such that a center of said dimple is displaced from the equator line, and said dimple is formed by a pin disposed at the parting surface of said mold sections such that a center axis passing the axial center of said pin is positioned below or above the parting line.

2. A golf ball of claim 1, wherein at least one pair of dimples are disposed and each of said dimples are at diametrically opposed positions along with the equator line of the ball.

3. The golf ball of claim 1 wherein the dimple lying across the equator is axisymmetric with respect to an axis of symmetry passing the center of the dimple, and the axis of symmetry is located outside and parallel to the equator plane of the ball.

4. The golf ball of claim 1 wherein the dimples are distributed in a regular icosahedral arrangement pattern.

5. The golf ball of claim 1 wherein the dimples are distributed in a regular octahedral arrangement pattern.

6. The golf ball of claim 1 wherein the dimples are distributed in a regular tetrahedral arrangement pattern.

7. The golf ball of claim 1 wherein the dimples are distributed in an arrangement pattern which is 2-fold axial about the pole of a hemisphere of the golf ball.

8. The golf ball of claim 1 wherein the dimples are distributed in an arrangement pattern which is 3-fold axial about the pole of a hemisphere of the golf ball.

9. The golf ball of claim 1 wherein the dimples are distributed in an arrangement pattern which is 4-fold axial about the pole of a hemisphere of the golf ball.

10. The golf ball of claim 1 wherein the dimples are distributed in an arrangement pattern which is 5-fold axial about the pole of a hemisphere of the golf ball.

* * * * *